March 11, 1958

C. E. MELROE 2,826,027

HARROW CULTIVATING IMPLEMENT

Filed July 30, 1956

INVENTOR
*Clifford E. Melroe*

BY *Burns, Doane, Benedict & Irons*

ATTORNEYS

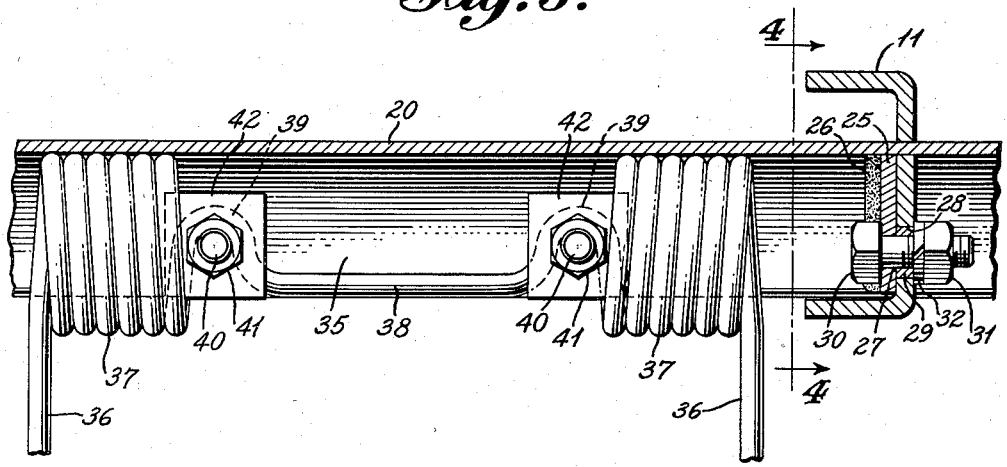
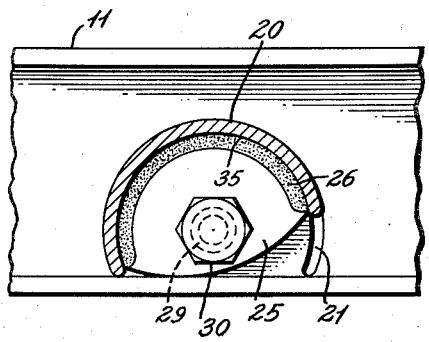

United States Patent Office 2,826,027
Patented Mar. 11, 1958

2,826,027

HARROW CULTIVATING IMPLEMENT

Clifford E. Melroe, Gwinner, N. Dak., assignor to Melroe Manufacturing Company, Gwinner, N. Dak., a corporation of North Dakota Application July 30, 1956, Serial No. 600,822

9 Claims. (Cl. 55—33)

This invention relates generally to a cultivating implement. More specifically, the invention is directed to a cultivating implement of the spring tooth harrow type. In the harrow construction of this invention automatic adjustability of the resiliently mounted teeth between a generally vertical position and an inclined angle position is provided for, depending upon which end of the implement is attached to the drawbar to be drawn across the ground to be cultivated.

A multitude of harrow constructions having discs, rigid teeth or spring teeth have been proposed and a variety of harrow implements are presently available for use in soil preparation or cultivation. In many harrows having rigid teeth of sufficient size and strength to withstand the sudden shock blows of engaging rocks and debris in the ground over which the harrow may be drawn, use of the harrow promotes "blowing" by powdering the topsoil. This action may be explained as due to the fact that the large rigid teeth do not properly penetrate to a suitable depth into the soil as the harrow is drawn thereacross. Diminishing the cross-sectional size of the teeth in this type of harrow naturally reduces the tooth strength such that the teeth are more susceptible to breakage under impact blows experienced in use. Such prior rigid tooth harrow constructions further have the disadvantage of becoming clogged with trash, stones, etc. in use, since when mounted on the harrow frame to engage the ground at an angle to operate effectively in soil cultivation, they tend to collect debris, old vegetation, etc.

Spring tooth harrow constructions have been developed wherein the teeth are in effect extensions of the endmost convolutions of coil springs. With the coil springs mounted on the harrow frame, the teeth are yieldable to a limited degree to have a self cleaning action in use. Prior structures employing coil spring harrow teeth have had the disadvantage that continued flexing and stressing of the coil springs has caused premature breaking off of the teeth. Attempts to overcome this problem as by increasing the size of the spring steel wire employed in the making of the coil spring teeth naturally increases the thickness of the teeth themselves and reduces the penetration of the teeth into the soil when the harrow is in use so as to make the harrow structure less effective.

A further problem in prior harrow construction, even where resiliently mounted teeth are employed, stems from the fact that under different soil conditions it may be desirable to have the teeth directed vertically or at an inclined angle with respect to the soil being worked. In prior spring tooth harrow constructions with the teeth mounted to extend at a fixed predetermined angle downwardly from the harrow frame, whereas the harrow may be suitable for use in certain soil conditions, the fixed angle of attack of the teeth may be unsuitable under other soil conditions or where a substantial amount of debris, stones, etc. are dispersed over the soil to be worked.

In development of the instant invention the coil spring harrow teeth are made of sufficiently thin spring steel wire such that the weight of the harrow, together with the relatively thin teeth, effects deeper penetration of the soil to thereby retain subsoil moisture by filling small subsoil air pockets as the harrow is drawn across the ground. Further, the thin teeth by their deep penetration do not powder the topsoil. The practicality of using thin spring steel wire in forming the coil spring teeth is obtained by providing the teeth carrying beams semi-cylindrical so as to encase the exterior of the coil springs. Thus, the spring coils are guided and precluded from being bent out of shape as tension loads are applied to the spring teeth when the teeth strike rocks or other obstructions. Further, by such encasing of the spring coil the tension applied through the tooth is distributed uniformly through the successive convolutions of the coil spring without the spring being distorted. To make the harrow construction of this invention universally adaptable for various soil conditions, the spring teeth are mounted to be automatically adjustable from a vertical position to an inclined angle position, depending upon which end of the harrow is attached to the drawbar to be drawn across the ground.

It is a primary object of this invention to provide an improved spring tooth harrow implement having a rigid frame and wherein the spring teeth are mounted to be shiftable from a vertical position to a self-cleaning position by merely drawing the implement from the opposite end to reverse the direction of draw of the harrow across the ground.

It is a further object of this invention to provide a spring tooth harrow implement wherein the spring coils are substantially encased to protect and guide flexing of the spring coils as the teeth engage with the ground in use of the harrow.

It is another object of this invention to provide a spring tooth harrow having encased spring coils to protect the spring teeth coils from undue distortion under sudden shock loads while permitting distribution of such loads to successive convolutions of the spring coil.

It is another object of this invention to provide a cultivating implement having a rigid frame including parallel longitudinal members and semi-cylindrical beams mounted transversely of said members with said members being provided at their opposite ends with means for attaching the implement to be drawn across the ground to be cultivated and with said beams mounted for limited pivotal movement with the semi-cylindrical portions of the beams opening downwardly to provide downwardly facing concavities and coil spring teeth secured within the downwardly facing concavities with the concavities closely conforming to the exterior curvature of the spring coils to protect the coils in flexing during use of the harrow cultivating implement.

With the above and other more specific objects in mind, as will be apparent by reference to the description given hereinafter of a specific embodiment of the invention, attention is directed to the drawings in which:

Figure 3 is a detailed sectional view taken on line 3—3 of Figure 2, and

Figure 4 is a sectional view taken on line 4—4 of Figure 3.

Figure 1:
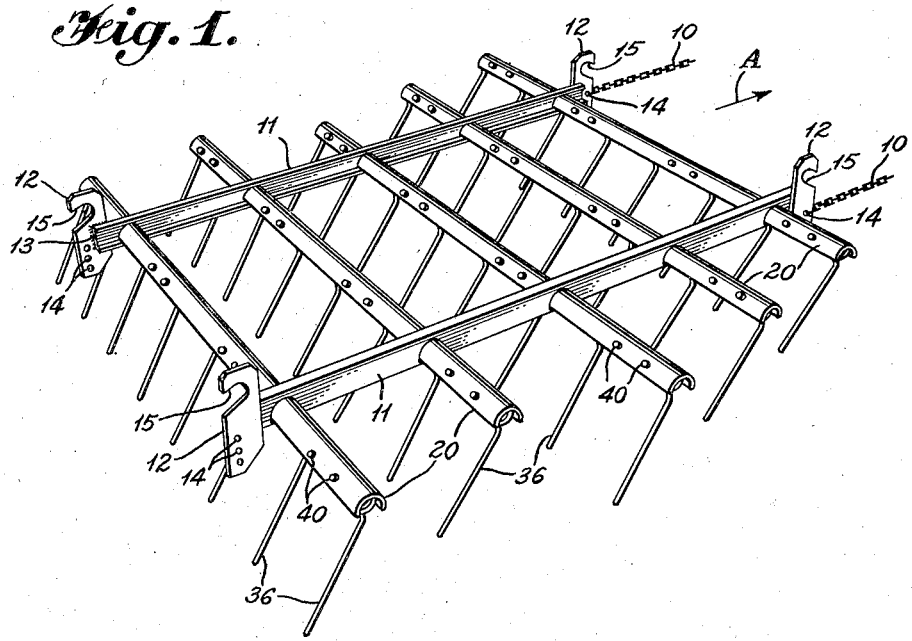
Figure 1 is a perspective view of the spring tooth harrow implement of this invention showing the teeth in an inclined angle position as assumed in one direction of draw of the harrow implement.

Referring to Figure 1, the spring tooth harrow implement of this invention is shown in perspective with the arrow A indicating the direction in which the harrow is being drawn as by means of chains 10 connected to a suitable drawbar (not shown). In this operating condition the spring teeth assume the inclined angle position as illustrated in Figure 1.

The harrow implement has a frame including parallel longitudinal members 11 which are of channel cross-section. The opposite ends of channel members 11 are provided with plates 12 to facilitate connection of the implement to a suitable drawbar construction and which plates are secured to such members by means of welding 13. The plates 12 are provided with apertures 14 to accommodate chains 10. The drawbar attaching plates 12 are further provided with notches 15 by means of which the harrow implement may be engaged with a suitable bar or rod provided on the drawbar construction (not shown) and the implement swung upwardly about such bar to transport the implement during nonuse.

It will be appreciated that by the provision of plates 12 at both ends of the harrow implement, the implement may be selectively drawn from either end in either direction by merely attaching chains 10 to the appropriate pair of plates 12. As will be more apparent from the description given hereinbelow, the drawing of the implement across the ground in a direction opposite to that shown in Figure 1 will result in the spring teeth automatically adjusting themselves to extend vertically downwardly relative to the harrow implement frame.

To complete the frame for the harrow cultivating implement a plurality of generally semi-cylindrical beams 20 are mounted on members 11 to extend transversely of said members and lie parallel with respect to one another. The beams 20 are connected to longitudinal members 11 in a manner as shown more clearly in Figures 2, 3 and 4. Such mounting includes arcuate slots 21 formed in the webs of channel members 11. A plurality of these slots, corresponding to the member of beams 20, are provided at spaced positions along the length of members 11 with the slots in each of the parallel members 11 being similarly spaced along the length of such members. The semi-cylindrical beams 20 extend through corresponding arcuate slots 21 in the members 11 so that the members 11 and beams 20 interact to form a rigid frame for the harrow implement.

Figure 2:
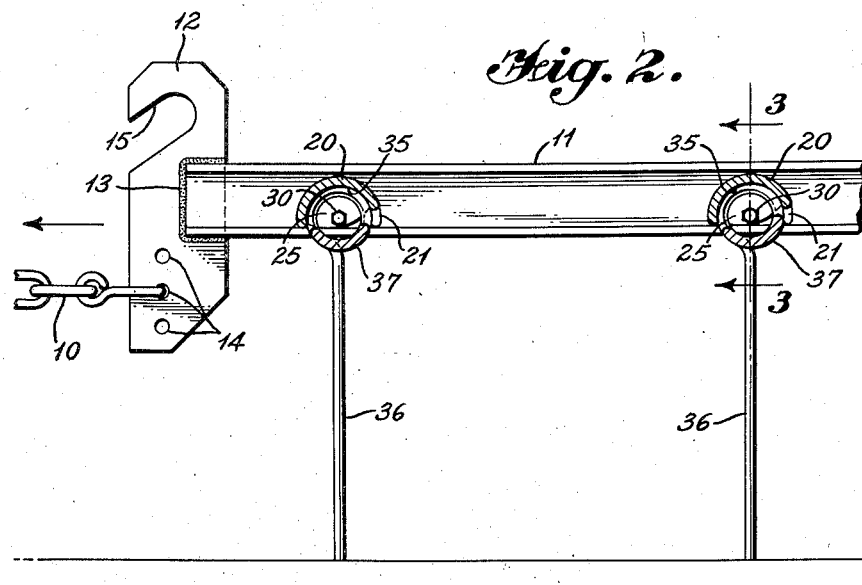
Figure 2 is a sectional view of a portion of the harrow implement illustrating the position assumed by the harrow spring teeth when the implement is drawn in a direction opposite to that of Figure 1.

As shown more clearly in Figures 2 and 4, it will be noted that the arcuate length of each of the slots 21 is greater than the length of the semi-cylindrical cross-section of the beams 20. It will thus be appreciated that beams 20 may partake of limited pivotal movement about their longitudinal axes within the slots 21 in which they are held. To further provide for and enable this limited pivotal movement of beams 20, there are provided bridging elements 25 secured within the concavity of each of the semi-cylindrical beams and disposed normal to the pivotal axis of such beams. These bridging elements are suitably attached as by means of welding 26. The bridging elements 25 are provided with an aperture 27 which coincides with the beam pivot axis.

In aperture 28 is formed within longitudinal members 11 concentric with each of the arcuate slots 21 and a bushing 29 is fitted into aperture 28 to be pivotal relative to such aperture. A bolt 30 having a nut 31 and lock washer 32 is engaged with each of the corresponding apertures 27 and bushings 29 to pivotally interconnect the beams and longitudinal members. It will be recognized that upon tightening of nut 31, bushing 29 will be clamped between bridging member 25 and lock washer 32 so that the bushing, upon pivotal movement of beam 20, moves relative to aperture 28.

The semi-cylindrical beams 20, as mounted in arcuate slots 21, are positioned to provide downwardly facing concavities 35 in which are mounted the spring harrow teeth. As will be recognized from the illustration on Figure 1, the individual teeth 36 extend downwardly from the underside of the beams 20 and are staggered longitudinally of the harrow implement so that in use of the implement the entire surface area over which the implement is drawn is worked by one or another harrow tooth.

Each tooth extends outwardly from the endmost convolution of a spring coil 37, as shown more clearly on Figure 3. In formation of the spring teeth, two of such teeth are made as a unit by forming from a continuous length of spring steel wire two coils 37 interconnected by a spacing segment 38. The opposite ends of segment 38 are provided with offsets 39 adjacent the innermost convolutions of the interconnected pair of coils 37. Offsets 39 are provided to cooperate with bolts 40 which extend through the semi-cylindrical wall of beams 20, pass through one of the offsets 39 and are provided with nuts 41 threaded thereon to rigidly mount the harrow tooth unit on beam 20. As illustrated, a square retaining tab 42 is positioned beneath nut 41 to overlap offset 39 and assist in rigidly retaining the spring coils properly positioned within the concavity 35 of beam 20.

It is particularly pointed out that the external radius of curvature of the spring coils 37 generally corresponds to the inner radius of curvature of concavities 35 formed on the underside of the semi-cylindrical beams 20. Thus, with the harrow teeth bolted in position, as shown in Figures 2 and 3, the beams 20 serve to encase the spring coils 37 enclosing a substantial portion of the exterior of such coils. In use, when the spring teeth 36 are subjected to heavy strain by engaging a rock or other obstruction in the ground being worked, the spring coils 37 are not distorted by yielding movement of the teeth 36, since the concavity 35 of beam 20 retains the coil in its generally helical configuration and the stress is transmitted successively through the convolutions of the spring coil. Thus it will be appreciated that essentially concavity 35 provides support for the sides of the coil 37 against lateral twisting of the coil in use about its point of rigid attachment to the beam and also support at the top of the coil to resist twisting of the coil about bolt 40 due to vertical forces transmitted through tooth 36. Accordingly, irrespective of the exterior configuration of the beam, its concavity, in conformity with the instant invention, must provide these support points for coil 37 to restrain and guide its coiling and uncoiling in use of the harrow. Obviously these coil support points, spaced around the coil periphery, lie in a generally semi-cylindrical pattern. In the specifically illustrated embodiment such a positioning of coil support points is provided by the inner surface of the semi-cylindrical beams 20.

The function and operation of the cultivating implement will be apparent from the description as given hereinabove. In use of the implement in a cultivating operation such as carried out in seed bed preparation, when the implement is drawn across the ground in a direction such as illustrated by the arrow on Figure 1, as by means of chains 10 attaching the implement to a tractor draw bar, the drag effect on teeth 36 will cause the semi-cylindrical beams 20 to pivot to a point where the leading edges thereof engage with the ends of the arcuate slots 21 in which the respective beams are held on members 11. Thus, the teeth 36 will assume an inclined angle position with reference to the ground surface. This may be called a self-cleaning position where, as the harrow implement is drawn across the ground, trash and stones will be dislodged from the teeth by the teeth trailing backwardly and yielding to a limited extent.

Where the implement is drawn in the opposite direction, as effected by engaging chains 10 with the opposite drawbar attaching plates 12, the positioning of teeth 36 will be as shown in Figure 2. Under this condition of operation, the semi-cylindrical beams 20 will be moved by reason of the drag on teeth 36 to a pivoted position where the opposite edges will be engaged with the opposite ends of the arcuate slots 21. In such condition the spring teeth 36 will extend generally vertically downwardly beneath the harrow implement frame.

The two-position characteristic of the harrow implement of this invention adapts the implement for use in a variety of soil conditions so that the same single harrow implement has universal adaptability. The kicking action of the relatively thin spring coil mounted teeth turns up the soil from underneath, rather than pushing over the top of the soil, as is characteristic of conventional harrow sections. The thinness of the teeth insures that the teeth always remain sharp for effective soil penetration while the encasing action of the semi-cylindrical beams protects against premature coil breakage during use of the harrow.

Having thus described my invention, what I claim is:

1. In a cultivating implement of the spring tooth harrow type, a frame including parallel longitudinal members and generally semi-cylindrical beams mounted transversely of said members, means for attaching the implement to be drawn across the ground to be cultivated, each of said beams being mounted on said members with the semi-cylindrical portion opening downwardly to provide a downwardly facing concavity, a plurality of spring harrow teeth each having a coil including a plurality of convolutions with an external radius of curvature generally corresponding to the inner radius of curvature provided by the concavity of said semi-cylindrical beams and a tooth portion extending outwardly from an endmost convolution of said coil, fastening means securing the coils of said harrow teeth at longitudinally spaced positions along the length of said beams within said concavity and with the tooth portions extending downwardly from the concavity of said beams, said concavity extending around said coils to provide support and guide points for the coils at the top and generally diametrically opposite sides of said coils.

2. In a cultivating implement as recited in claim 1 wherein said spring harrow teeth are formed in units with each unit including a pair of coils oppositely wound and interconnected with offsets being provided at the opposite ends of the interconnecting segment adjacent the innermost convolutions of the pair of coils and the tooth portions extend outwardly from the outermost convolutions of such pair of coils.

3. In a cultivating implement of the spring tooth harrow type, a frame including parallel longitudinal members and generally semi-cylindrical beams mounted transversely of said members, means at opposite ends of said members for attaching the implement to be drawn across the ground to be cultivated, each of said beams being mounted on said members for limited pivotal movement about its axis and with the semi-cylindrical portion opening downwardly to provide a downwardly facing concavity, a plurality of spring harrow teeth each having a coil including a plurality of convolutions with an external radius of curvature generally corresponding to the inner radius of curvature provided by the concavity of said semi-cylindrical beams and a tooth portion extending outwardly from an endmost convolution of said coil, and fastening means securing the coils of said harrow teeth at longitudinally spaced positions along the length of said beams within said concavity and with the tooth portions extending downwardly from the concavity of said beams, said concavity extending around said coils to provide support and guide points for the coils at the top and generally diametrically opposite sides of said coils.

4. In a cultivating implement of the spring tooth harrow type, a plurality of parallel longitudinal members having means for attaching the implement to be drawn across the ground to be cultivated, each of said members having arcuate slots formed at positions spaced along the length thereof, semi-cylindrical beams engaged with opposite corresponding slots in said members to extend transversely of said members with the semi-cylindrical portions thereof opening downwardly to provide downwardly facing concavities, said slots having an arcuate length greater than that of the semi-cylindrical cross-section of said beams to permit limited pivotal movement of said beams relative to said members, a plurality of spring harrow teeth each having a coil including a plurality of convolutions with an external radius of curvature generally corresponding to the inner radius of curvature provided by said concavity of said semi-cylindrical beams and a tooth portion extending outwardly from an endmost convolution of said coil, fastening means securing the coils of said harrow teeth at longitudinally spaced positions along the length of said beams within said concavity and with the tooth portions extending downwardly from the concavity of said beams, said concavity extending around said coils to provide support and guide points for the coils at the top and generally diametrically opposite sides of said coils.

5. In a cultivating implement as recited in claim 4 wherein said longitudinal members are channel shaped in cross-section and said arcuate slots are formed in the web of such channel cross-section.

6. In a cultivating implement of the spring tooth harrow type, a plurality of parallel longitudinal members having means at the opposite ends thereof for attaching the implement to be drawn across the ground to be cultivated, each of said members having arcuate slots formed at positions spaced along the length thereof, semi-cylindrical beams engaged with opposite corresponding slots in said members to extend transversely of said members with the semi-cylindrical portions thereof opening downwardly to provide downwardly facing concavities, the arcuate length of each of said slots being greater than the length of the semi-cylindrical cross-sections of said beams which are engaged with said slots to permit limited pivotal movement of said beams about their respective axes relative to said longitudinal members, a plurality of spring harrow teeth each having a coil with an external radius of curvature generally corresponding to the inner radius of curvature of said semi-cylindrical beams and a tooth portion extending outwardly from an endmost convolution of said coil, fastening means securing the coils of said harrow teeth at longitudinally spaced positions along the length of said beams within said concavity and with the tooth portions extending downwardly from the concavity of said beams, bridging elements secured within the semi-cylindrical portion of said beams normal to the pivot axis of said beams and each having an aperture formed therein coinciding with the beam pivot axis, said longitudinal members having apertures formed therein concentric with the arcuate slots, and pin means engaged with the apertures in each bridging element and the corresponding aperture in said members to pivotally secure said beams within the arcuate slots of said longitudinal members.

7. In a cultivating implement as recited in claim 6 wherein bushing means are provided in the apertures of said longitudinal members to provide bearings for pivotal support of said beams.

8. In a cultivating implement of the spring tooth harrow type, a plurality of longitudinal connecting members, means for attaching the implement to be drawn across the ground to be cultivated, a series of beams extending transversely of said connecting members, connecting means attaching said beams to said members at positions spaced along the length of said members, each of said beams as connected to said members providing a downwardly facing concavity, a plurality of spring harrow teeth each having a coil including a plurality of convolutions with an external radius of curvature generally corresponding to the inner radius of curvature provided by said concavity and a tooth portion extending outwardly from an endmost convolution of said coil, threaded fastening means rigidly securing the end opposite said endmost convolution to the inner wall of said concavity, said teeth being disposed at longitudinally spaced positions along the length of said beams, said coils being positioned within said concavity with the tooth portions thereof extending downwardly from the concavity, said concavity extending around said coils to provide support and guide points for said coils at the top and generally diametrically opposite sides of said coils.

9. In a cultivating implement of the spring tooth harrow type, a plurality of longitudinal connecting members, means at the opposite ends of said implement for attaching the implement to be drawn in opposite directions across the ground to be cultivated, a series of beams extending transversely of said members at positions spaced along the length of said members, connecting means pivotally attaching said beams to said members to permit free pivotal movement of said beams relative to said members, said beams and said members cooperating through said connecting means to prevent pivotal movement of said beams relative to said members beyond a first limit position and a second limit position, each of said beams as connected to said members providing a concavity, a plurality of spring harrow teeth each having a coil including a plurality of convolutions and a tooth portion extending outwardly from an endmost convolution of said coil, fastening means securing the coils of said harrow teeth at longitudinally spaced positions along the length of said beams within said concavity, said coils being secured with the tooth portions thereof extending outwardly of said concavity and substantially perpendicular to said members in said first position of said beams and inclined relative to said members in said second position of said beams.

References Cited in the file of this patent

UNITED STATES PATENTS

| | | |
|---|---|---|
| 716,912 | Macphail | Dec. 30, 1902 |
| 728,592 | Macphail | May 19, 1903 |
| 1,950,834 | Wyss | Mar. 13, 1934 |
| 2,005,044 | Muntzel | June 18, 1935 |
| 2,119,165 | Hornstein | May 31, 1938 |

FOREIGN PATENTS

| | | |
|---|---|---|
| 299,821 | Great Britain | Nov. 1, 1928 |
| 125,244 | Sweden | June 21, 1949 |